United States Patent
Kalisz et al.

(10) Patent No.: US 8,336,910 B1
(45) Date of Patent: Dec. 25, 2012

(54) ACTIVE BOLSTER WITH INTEGRATED TEAR SEAM

(75) Inventors: Raymond E. Kalisz, Livonia, MI (US); Michael G. Orlowsky, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/251,652

(22) Filed: Oct. 3, 2011

(51) Int. Cl.
*B60R 21/206* (2011.01)
(52) U.S. Cl. .................................... 280/730.1; 280/752
(58) Field of Classification Search ............... 280/728.2, 280/728.3, 730.1, 751–753
See application file for complete search history.

(56) References Cited

U.S. PATENT DOCUMENTS

| | | | | |
|---|---|---|---|---|
| 5,536,043 | A * | 7/1996 | Lang et al. ..................... | 280/753 |
| 5,772,238 | A * | 6/1998 | Breed et al. ................. | 280/728.2 |
| 5,931,493 | A * | 8/1999 | Sutherland .................. | 280/730.1 |
| 6,302,493 | B2 * | 10/2001 | Zemlicka ..................... | 301/64.301 |
| 6,431,583 | B1 * | 8/2002 | Schneider ................... | 280/728.2 |
| 6,688,643 | B2 * | 2/2004 | Schneider ..................... | 280/753 |
| 6,874,811 | B2 * | 4/2005 | Enders et al. .............. | 280/730.1 |
| 7,249,781 | B2 * | 7/2007 | Kai et al. .................... | 280/728.3 |
| 7,556,284 | B2 | 7/2009 | Riha et al. | |
| 2011/0115201 | A1 | 5/2011 | Best et al. | |
| 2011/0123739 | A1 | 5/2011 | Ciplijauskas et al. | |
| 2011/0133435 | A1 | 6/2011 | Sadr et al. | |

OTHER PUBLICATIONS

Bijoy K. Saraf, et al., Active Bolster for Side Impact Protection, SAE Technical Paper Series 2008-01-0191, 2008, pp. 1-11.

* cited by examiner

*Primary Examiner* — Joseph Rocca
*Assistant Examiner* — Robert A Coker
(74) *Attorney, Agent, or Firm* — Gregory P. Brown; MacMillan, Sobanski & Todd, LLC

(57) ABSTRACT

An active bolster is provided on an generally-planar interior trim panel. An invisible tear seam in the panel follows a closed path that is spaced away from a peripheral edge of the panel. An inflatable bladder has a rim bonded to the panel along an inward edge of the tear seam. A bowl-shaped reaction frame has a cavity receiving the inflatable bladder and has a rim bonded to the panel along an outward edge of the tear seam, so that the inflatable bladder is contained between the reaction frame and the interior trim panel. Inflation of the inflatable bladder causes the interior trim panel to tear at the tear seam causing the portion of the interior trim panel within the closed path to separate and expand away from the reaction frame into the passenger compartment.

8 Claims, 4 Drawing Sheets

ACTIVE BOLSTER WITH INTEGRATED TEAR SEAM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to active bolsters for crash protection of passengers in moving vehicles, and, more specifically, to the mounting and concealment of an active bolster.

Occupant crash protection is an important consideration in the design and use of motor vehicles. One type of protection device is an active bolster in which a trim surface within a passenger compartment is used as a cushion to more smoothly decelerate an occupant. Interior trim surfaces where active bolsters can be deployed include the instrument panel in the vicinity of an occupant's knee or the interior surface of a side door, for example.

In the active bolster, a gas-inflatable bladder expands toward an occupant during a crash event to absorb impacts and reduce trauma. In one example, pending application U.S. Ser. No. 12/824,150, filed Jun. 26, 2010, discloses an active knee bolster integrated into a glove box door that is light weight and visually attractive.

Known active bolsters have been made as distinct components mounted in the interior at a location where a passenger may be thrown during a crash. Thus, the entire Class A surface (i.e., visible side) of the active bolster component expands toward an occupant. The distinct active bolster component is typically mounted directly to a vehicle frame substructure and is located within or adjacent to a generally flat surface of an instrument panel or side door, for example. Gaps or other types of cut lines typically occur along at least some edges of the active bolster between the bolster and the adjacent elements of the interior trim panel. Closely-controlled tolerances are required in the mounting and relative positions of the various trim elements in order to ensure a satisfactory appearance along the gaps. Based on passenger position relative to the trim and/or the particular details of the seating layout within the passenger compartment, there may be certain optimal locations for the placement of an active bolster. But due to appearance or other considerations, it may often not be desirable to have cut lines at these optimal locations. Thus, it would be desirable to eliminate gaps or cut lines for both improved appearance and reduced cost.

SUMMARY OF THE INVENTION

In one aspect of the invention, an active bolster for use in a passenger compartment of a vehicle comprises a generally-planar interior trim panel having a Class A surface for facing the passenger compartment. The Class A surface defines a peripheral edge of the trim panel and has a Class B surface opposite the Class A surface. The interior trim panel has a tear seam into the Class B surface that follows a closed path that is spaced away from the peripheral edge. The tear seam is comprised of a reduction in thickness of the interior trim panel along the closed path. An inflatable bladder comprised of a flexible plastic material has a rim bonded to the Class B surface along an inward edge of the tear seam. The inflatable bladder has a pleated surface for expanding in response to inflation by an inflation gas. An inflator is coupled to the inflatable bladder for providing the inflation gas. A bowl-shaped reaction frame has a cavity receiving the inflatable bladder and has a rim bonded to the Class B surface along an outward edge of the tear seam, so that the inflatable bladder is contained between the reaction frame and the interior trim panel. The tear seam is invisible viewed from the Class A surface prior to inflation. Inflation of the inflatable bladder causes the interior trim panel to tear at the tear seam causing the portion of the interior trim panel within the closed path to separate and expand away from the reaction frame into the passenger compartment.

DETAILED DESCRIPTION OF PREFERRED EMBODIMENTS

Figure 1:
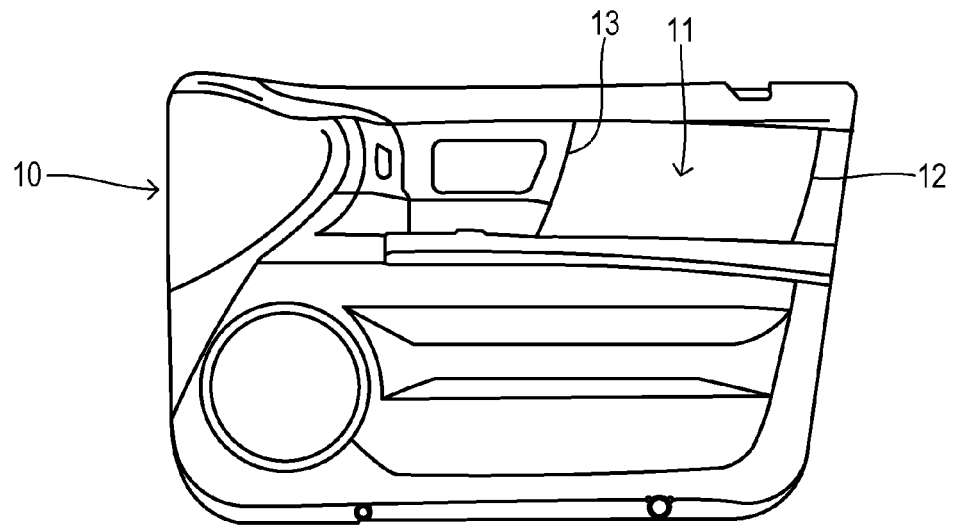
FIG. 1 is a plan view of a conventional vehicular door having an active bolster with cut lines in the surface of the door.

Referring now to FIG. 1, a conventional motor vehicle door 10 has various interior trim components attached to it including an active bolster 11. With bolster 11 being mounted as a separate component, gaps or cut lines 12 and 13 must be maintained between bolster 11 and adjacent trim components such as finish-panel sections. In addition to interior door surfaces, active bolsters of the present invention may also be deployed on instrument panels, seat side surfaces, seat backs, roof panels, roof pillars, and other interior components in order to protect passengers during a crash.

Figure 2:
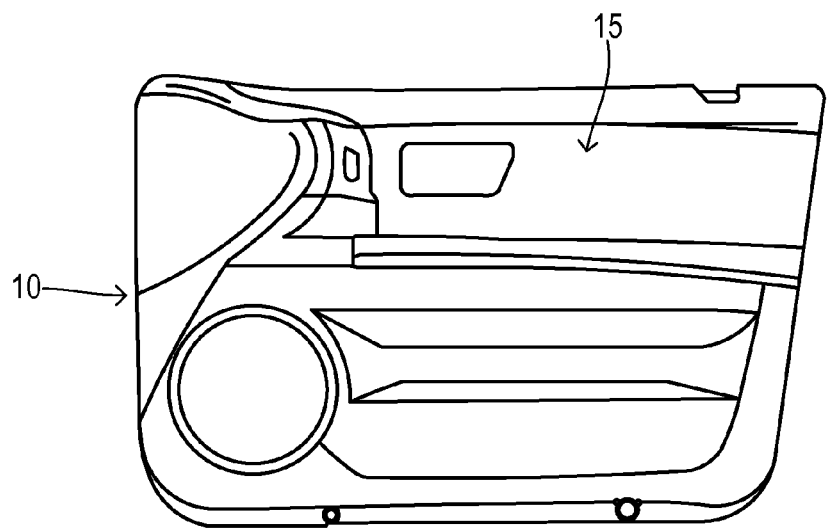
FIG. 2 is a plan view of a vehicular door employing an active bolster of the present invention without visible cut lines.
Figure 3:
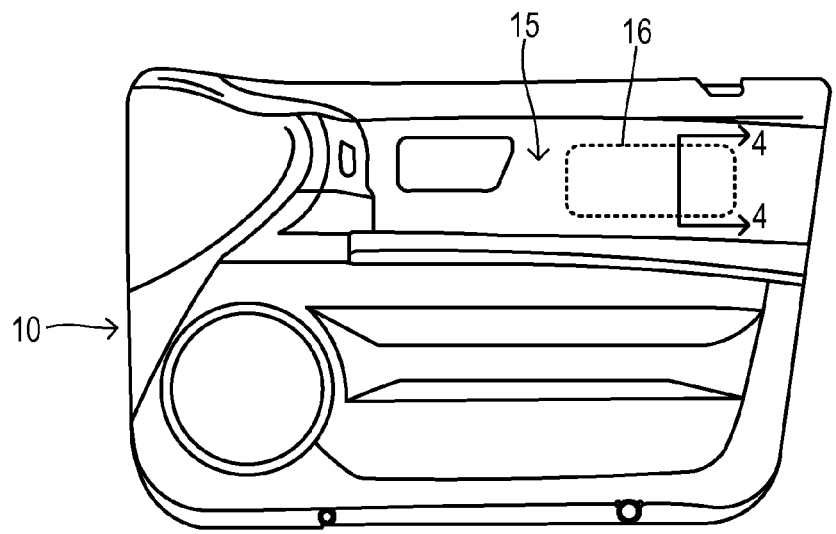
FIG. 3 is a plan view of the door of FIG. 2 showing the location of an is invisible tear seam.

In order to eliminate cut lines associated with an active bolster, the present invention includes an active bolster hidden behind a generally-planar interior trim panel 15 as shown on door 10 in FIG. 2. The elimination of cut lines in FIG. 2 achieves a cleaner appearance and greatly improves styling flexibility. FIG. 3 shows dashed line 16 indicating where an active bolster is concealed behind trim panel 15. Line 16 shows a closed path for a hidden tear seam to create a panel section that will tear and expand away from door 10 to function as an active bolster.

Figure 4:
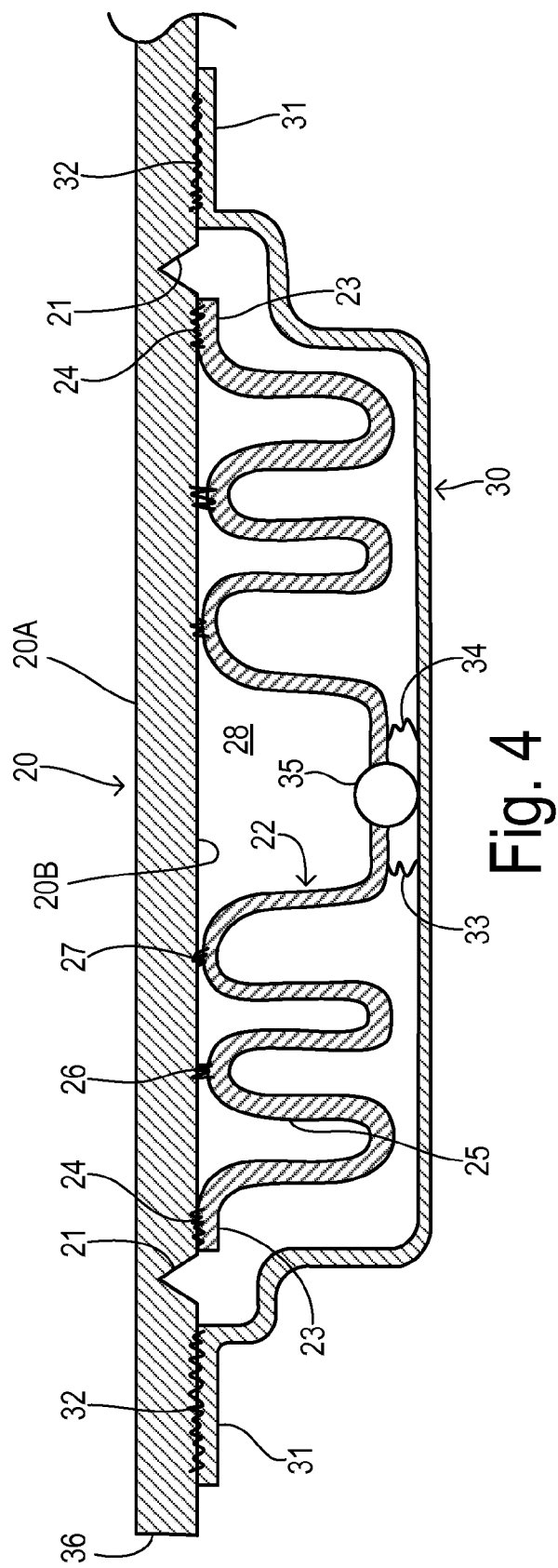
FIG. 4 is a cross section of the active bolster along lines 4-4 of FIG. 3.

Referring to FIG. 4, an interior trim panel 20 has a Class A surface 20A which faces the passenger compartment and a Class B surface 20B opposite the Class A surface. Trim panel 20 is generally planar and has a color and surface treatment or texture to provide the finished appearance for the vehicle interior. Alternatively, Class A surface 20A could also be wrapped or otherwise coated with a skin or other thin finishing layer without altering the other features of the bolster. Interior trim panel 20 may preferably be formed by injection molding using thermoplastics or other materials that are conventionally employed for interior trim panels. A tear seam 21 is formed into Class B surface 20B such that it follows a closed path which is spaced away from the peripheral edge 36 of interior trim panel 20. Tear seam 21 is comprised of a reduced thickness of panel 20. This may be a feature molded-in during initial injection molding of panel 20, or could be formed later by cutting or scoring into Class B surface 20B.

An inflatable bladder 22 is comprised of a flexible plastic material (such as polyethylene, polyolefin, or PVC) and has a rim 23 bonded to Class B surface 20B along an inward edge of tear seam 21. Bladder 22 has a series of pleats, such as a pleat 25, to allow for expansion of inflatable bladder 22. The upper edges of the pleats may be preferably bonded to Class B surface 20 B via a plastic weld, adhesive bonds, or other known attachments. Rim 23 is hermetically bonded at 24 completely around the periphery of tear seam 21 creating an internal chamber 28. Bonds 26 and 27 assist in providing rigidity of panel 20 prior to deployment (i.e., inflation of bladder 22) to help reduce the "oil-canning" effect.

A bowl-shaped reaction frame 30 creates a cavity for receiving inflatable bladder 22. A rim 31 of reaction frame 30 is bonded to Class B surface 20B along an outward edge of tear seam 21 so that inflatable bladder 22 is contained between reaction frame 30 and interior trim panel 20. Bond 32 strongly joins rim 31 to panel 20 so that it is sufficient to withstand the forces created during inflation of bladder 22. Reaction frame 30 is coupled with inflatable bladder 22 via tethers 33 and 34 to prevent the inflated bladder from falling out of frame 30 after inflation and tearing of seam 21.

An inflator 35 is mounted within reaction frame 35 and has a gas output configured to supply inflation gas into chamber 28 in a known manner.

Figure 8:
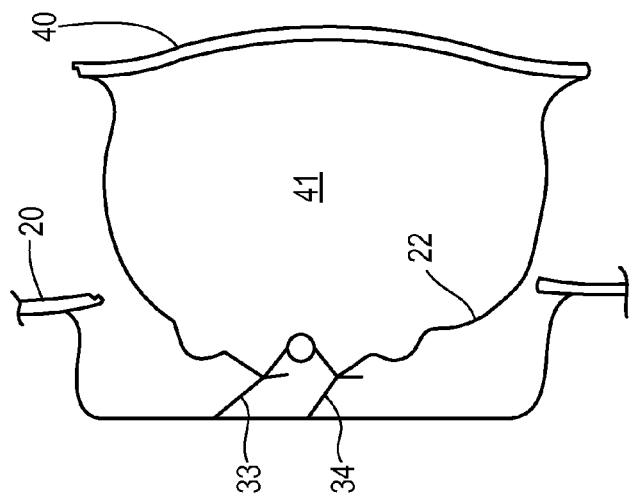
FIGS. 5-8 are cross-sectional views of an active bolster at respective times during a deployment.
Figure 7:
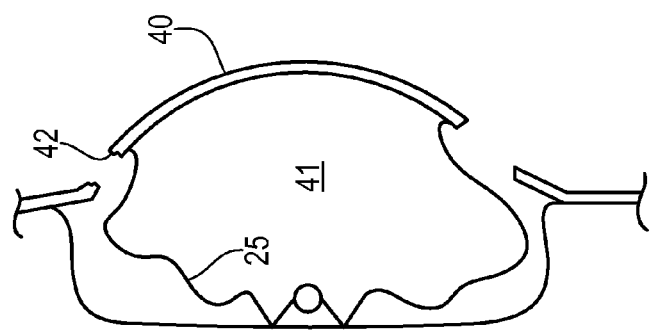
Figure 6:
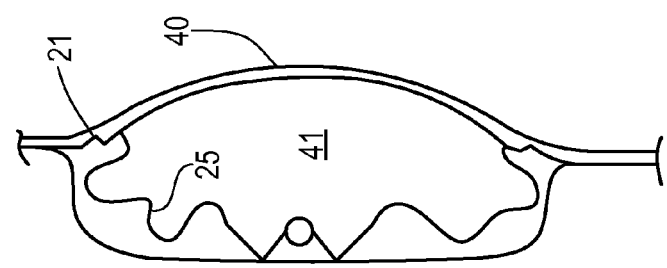
Figure 5:
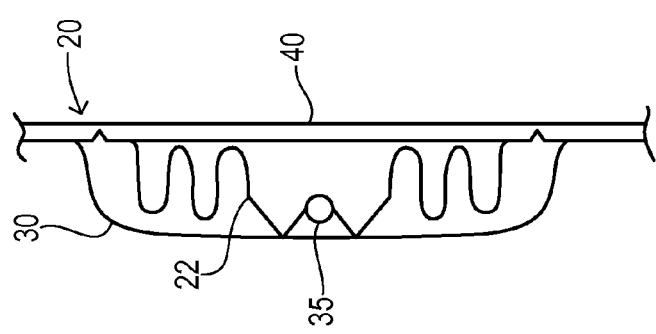

FIGS. 5-8 show an inflation sequence of the active bolster of the present invention. In FIG. 5, inflator 35 has not yet been activated. Thus, interior trim panel 20 has its original generally-planar shape including an interior trim section 40 within the boundaries of the tear seam which will become the active surface of the bolster. After initiation of inflation gas flow from inflator 35 in response to a crash controller (not shown), a chamber 41 within inflatable bladder 22 begins to enlarge. FIG. 6 shows inflation after about 5 milliseconds. Trim section 40 begins to expand outwardly in response to enlargement of chamber 41, and tear seam 21 begins to deform. After about 10 milliseconds, tear seam 21 breaks along a torn edge 42 and trim section 40 moves increasingly outward as shown in FIG. 7. To accommodate the enlargement of chamber 41, pleat 25 and the other pleats begin to straighten out. After about 15 milliseconds, as shown in FIG. 8, trim panel section 40 is fully separated and expanding away from trim panel 20. Tethers 33 and 34 do not tear, and they continue to hold trim panel section 40 and bladder 22 in a position where they will receive an impacting passenger.

Figure 9:
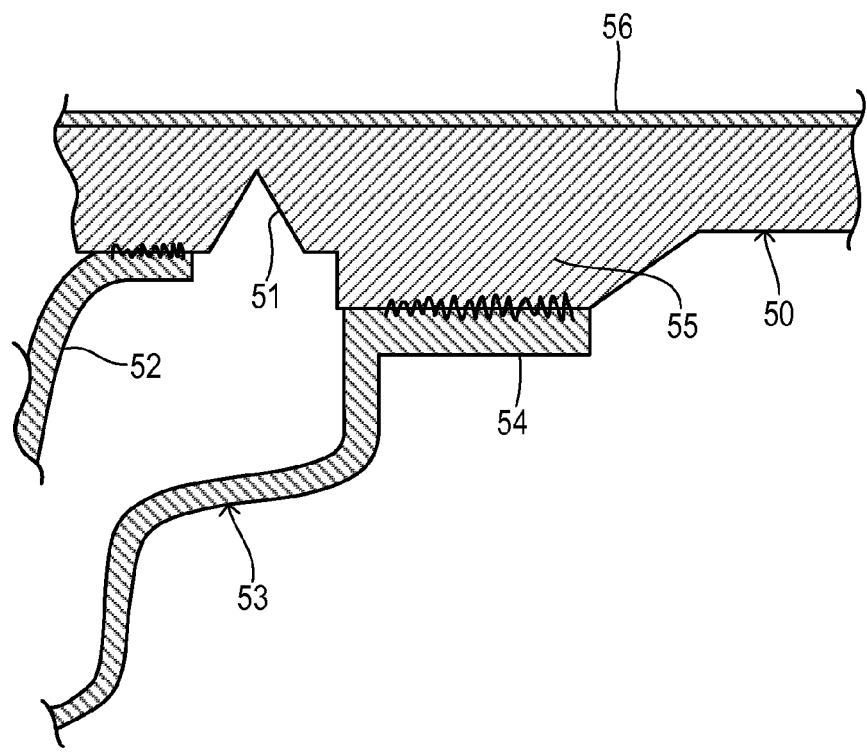
FIG. 9 is a cross section showing an alternative embodiment of the active bolster.

FIG. 9 shows an alternative embodiment wherein an interior trim panel 50 includes features for reinforcing the attachment between the panel and an active bolster. Trim panel 50 includes an in-mold tear seam 51 defining a tear-away bolster surface to which an inflatable bladder 52 is bonded. A bowl-shaped reaction frame 53 has a rim 54 bonded to a reinforced, thickened flange 55 extending from the Class B side of trim panel 50. By providing a thickened flange in the area for attachment, a stronger bond can be achieved in order to prevent separation of reaction frame 53 from trim panel 50 under the influence of the inflation forces. Bonding of the inflatable bladder and/or the reaction frame to the interior trim panel is preferably achieved by plastic welding, such as vibration welding or hot plate welding. Alternatively, an adhesive (i.e., chemical) or a mechanical bond could be employed.

FIG. 9 also shows a skin 56 wrapped or otherwise covering the Class A side of trim panel 50 to achieve the desired final appearance and color. Skin 56 is sufficiently thin and tearable so that the functioning of the inflating bolster is not impeded.

The present invention allows an active bolster to be joined to the interior is side of a trim panel without any other support or interconnection directly to the vehicle frame or other substructure (other than any electrical wires connected to the inflator). Since no specialized mounting is required for attaching the bolster to the substructure of the interior trim component such as a door, instrument panel, roof, or other interior surface, production and manufacturing costs are minimized. The interior trim component itself which carries the active bolster can be attached to the main substructure in any traditional manner and at any convenient mounting locations using clips or screws, for example.

What is claimed is:

1. An active bolster for use in a passenger compartment of a vehicle, comprising:
    a generally-planar interior trim panel having a Class A surface for facing the passenger compartment, the Class A surface defining a peripheral edge of the trim panel, the interior trim panel having a Class B surface opposite the Class A surface, wherein the interior trim panel has a tear seam into the Class B surface following a closed path that is spaced away from the peripheral edge, and wherein the tear seam is comprised of a reduction in thickness of the interior trim panel along the closed path;
    an inflatable bladder comprised of a flexible plastic material, wherein the inflatable bladder has a rim bonded to the Class B surface along an inward edge of the tear seam, and wherein the inflatable bladder has a pleated surface for expanding in response to inflation by an inflation gas, and wherein the pleated surface is formed by a plurality of pleats having ends joined to the Class B surface by respective frangible bonds that are broken during the inflation
    an inflator coupled to the inflatable bladder for providing the inflation gas; and
    a bowl-shaped reaction frame having a cavity receiving the inflatable bladder and having the rim bonded to the Class B surface along an outward edge of the tear seam, so that the inflatable bladder is contained between the reaction frame and the interior trim panel;
    wherein the tear seam is invisible viewed from the Class A surface prior to inflation, and wherein inflation of the inflatable bladder causes the interior trim panel to tear at the tear seam causing the portion of the interior trim panel within the closed path to separate and expand away from the reaction frame into the passenger compartment.

2. The active bolster of claim 1 wherein the bonding of the reaction frame to the Class B surface provides substantially all of the structural support for the reaction frame.

3. The active bolster of claim 1 wherein the interior trim panel and the reaction frame are each comprised of injection-molded plastic.

4. The active bolster of claim 3 wherein the inflatable bladder and the reaction frame are each bonded to the Class B surface by plastic welding.

5. The active bolster of claim 4 wherein the plastic welding is comprised of vibration welding.

6. The active bolster of claim 1 wherein the interior trim panel is arranged on a front instrument panel of the vehicle.

7. The active bolster of claim 1 wherein the interior trim panel is arranged on a side door of the vehicle.

8. The active bolster of claim 1 further comprising a flexible skin wrapped over the interior trim panel.

* * * * *